United States Patent
Lefranc et al.

(10) Patent No.: US 7,991,151 B2
(45) Date of Patent: Aug. 2, 2011

(54) METHOD FOR SECURE DELEGATION OF CALCULATION OF A BILINEAR APPLICATION

(75) Inventors: David Lefranc, Caen (FR); Marc Girault, Caen (FR)

(73) Assignee: France Telecom, Paris (FR)

( * ) Notice: Subject to any disclaimer, the term of this patent is extended or adjusted under 35 U.S.C. 154(b) by 1063 days.

(21) Appl. No.: 11/667,031

(22) PCT Filed: Oct. 21, 2005

(86) PCT No.: PCT/FR2005/002633
§ 371 (c)(1),
(2), (4) Date: May 3, 2007

(87) PCT Pub. No.: WO2006/048524
PCT Pub. Date: May 11, 2006

(65) Prior Publication Data
US 2007/0260882 A1    Nov. 8, 2007

(30) Foreign Application Priority Data

Nov. 4, 2004 (FR) ...................... 04 11777

(51) Int. Cl.
*H04L 9/00* (2006.01)
(52) U.S. Cl. ............... 380/28; 380/30; 713/155; 705/74

(58) Field of Classification Search ............ 380/28, 380/30; 713/155; 705/74
See application file for complete search history.

(56) References Cited

U.S. PATENT DOCUMENTS

| 5,369,708 | A | 11/1994 | Kawamura et al. |
| 6,779,111 | B1 | 8/2004 | Gehrmann et al. |
| 7,113,594 | B2 * | 9/2006 | Boneh et al. ............ 380/28 |
| 7,590,236 | B1 * | 9/2009 | Boneh et al. ............ 380/30 |
| 2003/0161472 | A1 | 8/2003 | Tong et al. |
| 2003/0177350 | A1 * | 9/2003 | Lee .................. 713/155 |
| 2003/0182554 | A1 | 9/2003 | Gentry et al. |
| 2004/0139029 | A1 * | 7/2004 | Zhang et al. ............ 705/74 |

FOREIGN PATENT DOCUMENTS

EP   0 381 523 A   8/1990

* cited by examiner

*Primary Examiner* — Vivek Srivastava
*Assistant Examiner* — Michael Anderson
(74) *Attorney, Agent, or Firm* — Cohen Pontani Lieberman & Pavane LLP

(57) ABSTRACT

A technique for secure delegation of calculation of a value $f(X,Y)$ of a bilinear application in a computational server. The technique comprises selection of two secret parameters a and b; calculation of the numbers $X^a$ and $Y^b$; supply of the two numbers $X^a$ and $Y^b$ to the computational server; calculation of $f(X^a, Y^b)$ by said server; receipt of the value of $f(X^a, Y^b)$ from the server; extraction of the $ab^{th}$ root of $f(X^a, Y^b)$.

15 Claims, No Drawings

METHOD FOR SECURE DELEGATION OF CALCULATION OF A BILINEAR APPLICATION

RELATED APPLICATIONS

This is a U.S. National Phase Application under 35 USC 371 of International Application PCT/FR2005/002633 filed on Oct. 21, 2005.

FIELD OF THE INVENTION

The present invention relates to a method of securely delegating the calculation of a value f(X,Y) of a bilinear application to a computational server. It also relates to a method of securely verifying that a value f(X,Y) of a bilinear application is equal to a given value, and to a method of securely verifying that two values f(X,Y) and f(Z,T) of a bilinear application are equal.

The invention relates very generally to the field of cryptography and more precisely to cryptographic methods of providing protection against fraud to a medium such as an electronic chip in transactions between a chip and a banking application or an electronic chip of a mobile telephone SIM card.

The invention finds a particularly advantageous application in the use of new cryptographic methods deemed at present to be too costly in computation time, such as methods using bilinear functions.

BACKGROUND OF THE INVENTION

At present, microchip cards are liable to suffer different types of fraud.

A first type of fraud consists in duplicating the card without authorization, the term "cloning" often being used to characterize this operation.

A second type of fraud consists in modifying the data attached to a card, in particular the amount of credit written in the memory of the card.

Cryptography is used to combat these types of fraud, both to authenticate the card by means of an authentication algorithm and/or to authenticate the data by means of a digital signature, and also, where appropriate, to ensure the confidentiality of the data by means of encryption.

Cryptography employs two entities which, for authentication, consist in a verifier entity and in an object to be authenticated. The cryptography may be either symmetrical or asymmetrical.

With symmetrical cryptography, also known as secret key cryptography, both entities share exactly the same information, in particular said secret key.

With asymmetrical, or public key, cryptography, one of the entities, the entity to be authenticated, holds a pair of keys, one of which is private and the other public; there is therefore no shared secret key.

The first authentication mechanisms to be developed for symmetrical cryptography consist in calculating once and for all an authentication value that is different for each card, storing it in the memory of the card, reading it on each transaction, and verifying it by interrogating an application of the network supporting the transaction in which authentication values that have already been assigned are either stored or recalculated. However, those mechanisms provide insufficient protection because the authentication value can be intercepted, reproduced, and replayed fraudulently as it is always the same for a given card, thus enabling a clone of the card to be produced. To combat cloning, passive card authentication mechanisms are replaced by active authentication mechanisms that can also ensure the integrity of the data.

The general principle of symmetrical active authentication mechanisms is as follows: at the time of authentication, the electronic chip and the application calculate an authentication value that is the result of applying a function to a list of arguments determined for each authentication. That list of arguments may include a random challenge defined by the application on each authentication, data contained in the electronic chip, and a secret key known to the electronic chip and the application. If the authentication value calculated by the electronic chip is identical to the authentication value calculated by the application, the electronic chip is deemed to be authentic and the transaction between the chip and the application is authorized.

However, secret key mechanisms require the verification devices for authenticating the chip, such as those present in a public telephone network, an electronic payment terminal, or a public transport turnstile, to know the secret key held by said chip. There is then a major drawback in that, if said device is required to be able to authenticate any chip issued in relation to the application, it must either store the secret keys of all the chips, or else it must store a base key for working out the secret key of any chip, known as a mother key or master key. Either way, each device stores sufficient information to be able to work out the secret keys of all the chips issued and therefore stores sufficient information to be able to clone any of them. It follows that successful hacking of any of the verification devices would entirely destroy the security of the application.

Thus solutions based on public key cryptography may be preferred over secret key mechanisms. The principle of public key authentication mechanisms is as follows: the chip seeking to be authenticated calculates values depending on its private key, associated with its public key, and any random parameters. The application then verifies that the values calculated by the chip are consistent without needing to know the private key of the chip. Only the public key of the chip is needed, together with other non-secret parameters.

The best-known solutions for producing such mechanisms are generally based on mathematical problems that are difficult to solve, such as factorization and the discrete logarithm. Moreover, implementing these problems generates modular exponentiation calculations, i.e. calculations of the type $x^e$ mod n where mod denotes the modular reduction mathematical function. This type of calculation is a priori the most complex operation that can be carried out in a reasonable time without making any assumptions as to calculation power.

Bilinear applications, well known to mathematicians, have entered the field of cryptography in the past few years.

Consider, for example, an application f defined on the set $G_1 \times G_2$ in G, where $G_1$, $G_2$ and G are cyclic groups. If $g_1$ and $g_2$ are generators of $G_1$ and $G_2$, respectively, the application f is known as a bilinear application of $G_1 \times G_2$ in G if:

$$f(g_1^a, g_2^b) = [f(g_1, g_2)]^{ab}.$$

However, the current problem linked to bilinear applications is that their evaluation generates very large volumes of calculations that are much more complex than those involved in a modular exponentiation calculation, for example. Hence the impossibility of implementing such calculations at present in the context of the applications envisaged.

SUMMARY OF THE INVENTION

One object of the present invention is to enable effective integration of cryptographic methods based on the use of bilinear functions, ensuring a maximum degree of security compatible with the uses made thereof, and despite the difficulty linked to their calculation complexity.

DETAILED DESCRIPTION

According to an embodiment of the present invention, a method is provided for securely delegating the calculation of a value f(X,Y) of a bilinear application to a computational server, the method being noteworthy in that it comprises the steps of:

choosing two secret parameters a and b;
calculating the numbers $X^a$ and $\overline{Y}^b$;
supplying the two numbers $X^a$ and $Y^b$ to the computational server;
said computational server calculating $f(X^a, Y^b)$;
receiving the value of $f(X^a, Y^b)$ from the computational server; and
extracting the $ab^{th}$ root of $f(X^a, Y^b)$.

According to an embodiment of the invention, an entity participating in, say, a cryptographic authentication method that involving the calculation of a bilinear function f(X,Y), communicates with a computational server having specifically the property of being endowed with high calculation power, but without it being necessary to assume any other property in relation to that server, in particular its level of security. In fact, over and above the advantage of enabling the use of bilinear functions in cryptography, by using secret parameters known only to the client entity of the computational server, the method of the invention also secures the data exchanged and strengthens the confidence in the results obtained.

It is important to point out that, generally speaking, said entity using the computational server may be either the entity to be authenticated or the verifier entity.

The effect of embodiments of the invention is therefore to delegate to the server most of the calculations involving bilinear functions and to ensure that the results returned by said server are secure in the sense that the chances of a malicious person succeeding in stealing the identity of a person using their public key would remain very low unless they also know the associated private key and have complete control over the computational server.

The delegation method according to an embodiment of the invention is advantageously applied to two particular situations.

A first situation relates to a method of verifying that a value f(X,Y) of a bilinear application is equal to a given value u by securely delegating to a computational server, the method being noteworthy in that said method comprises the steps of:

choosing two secret parameters a and b;
calculating the numbers $X^a$ and $\overline{Y}^b$;
supplying the two numbers $X^a$ and $Y^b$ to the computational server;
said computational server calculating $f(X^a, Y^b)$;
receiving the value of $f(X^a, Y^b)$ from the computational server; and
comparing the value of $f(X^a, Y^b)^p$ to the number $u^q$, the numbers p and q satisfying the equation abp=q.

The following signature mechanism illustrates this method of verifying that a value of a bilinear application is equal to a given value.

The signatory of a message m holds a public key defined by three numbers, for example: $\overline{g}_1 \in G_1$, $g_2 \in G_2$ and $v = g_2^x$, x being the private key of the signatory. The verifier entity receiving the message knows the three numbers constituting the public key but does not know the private key.

The signatory of the message draws a number r at random and calculates the number σ given by:

$$\sigma = g_1 \exp(m+rx)^{-1}.$$

The signatory then sends the recipient of the message the pair of numbers {σ,r}.

To ensure the authenticity of the message, i.e. the integrity of its content and the identity of its sender, the recipient verifies the following equality, f being a bilinear function:

$$f(\sigma, g_2^m v^r) = f(g_1, g_2)$$

This equality results from the use of the definition of the arguments of the left-hand member and from the property of bilinear functions referred to above.

Knowing the arguments of the right-hand member in advance, the receiver can have the computational server carry out the corresponding calculation of the bilinear function once and for all. Thus $f(g_1, g_2)$ is equal to a given known number u.

The verification mechanism therefore involves the server calculating the quantity $f(\sigma, g_2^m v^r)$. For this purpose, the verifier entity, here the recipient of the message, chooses two numbers a and b, calculates $\sigma^a$ and $g_2^{bm} v^{br}$ and sends them to the server, which sends back the value $f(\sigma^a, g_2^{bm} v^{br})$, which by definition has the value $f(\sigma, g_2^m v^r)^{ab}$. The verifier entity therefore now need only verify that the number sent back to it by the computational server is equal to uab or to compare $[f(\sigma^a, g_2^{bm} v^{br})]^p$ to $u^q$ with abp=q in or any other equivalent way.

It is found in such circumstances that the verifier entity must calculate three values, such as: $\sigma^a$, $g_2^{bm} v^{br}$, and $u^{ab}$.

Depending on the verification equation concerned, in order to reduce the number of calculations to effected, one of the parameters a or b may be made equal to 1.

A second application of the calculation delegation method according to an embodiment of the invention provides a method of verifying that two values f(X,Y) and f(Z,T) of a bilinear application are equal by securely delegating calculation to a computational server, which method is noteworthy, in accordance with the invention, in that it comprises the following steps:

choosing four secret parameters a, b, c and d;
calculating the numbers $X^a$, $Y^b$, $\overline{Z}^c$, and $T^d$;
supplying the four numbers $X^a$, $Y^b$, $Z^c$, and $T^d$ to the computational server;
said computational server calculating $f(X^a, Y^b)$ and $f(Z^c, T^d)$;
receiving the values of $f(X^a, Y^b)$ and $f(Z^c, T^d)$ from the computational server; and
comparing the values of $[f(X^a, Y^b)]^p$ and $[f(Z^c, T^d)]^q$, the numbers p and q satisfying the equation abp=cdq.

The following signature mechanism gives an illustrative example of this method of securely verifying that two values of a bilinear application are equal.

In this example, it is assumed for simplicity that all the arguments of the bilinear functions concerned belong to the same cyclic group G.

The public key of the signatory of the message m comprises a number $g \in G$ and a number $v = g^x$ that also belong to the group G, x being the private key of the signatory.

The signatory has a hashing function h which associates an element h(m) of the group G with the message m, this hashing function being shared with the recipient responsible for authenticating the message m.

The signatory then sends the recipient the message m and the signature $\sigma=h(m)^x$. To authenticate the message the recipient verifies the following equation:

$$f(\sigma,g)=f(h(m),v).$$

As above, this equality results from the definition of the arguments and the property of the bilinear functions.

The verifier entity delegates the calculation of each member of the above equation to the computational server in the following manner.

For the left-hand member, the verifier entity chooses two secret parameters a and b, calculates $\sigma^a$ and $g^b$, and sends them to the server, which sends back $f(\sigma^a,g^b)=[f(\sigma,g)]^{ab}$.

Likewise, for the right-hand member, the verifier entity chooses two other parameters c and d, calculates $h(m)^c$ and $v^d$, and sends these values to the server, which sends back $f(h(m)^c,v^d)=[f(h(m),v)]^{cd}$.

The verifier entity must then verify that:

$$[f(\sigma^a,g^b)]^{cd}=[f(h(m)^c,v^d)]^{ab}$$

or, more generally, with abp=cdq, the equation:

$$[f(\sigma^a,g^b)]^p=[f(h(m)^c,v^d)]^q.$$

Under such circumstances, the verifier entity must calculate six values, namely $\sigma^a$, $g^b$, $h(m)^c$ and $v^d$, as well as $[f(\sigma^a, g^b)]^{cd}$ and $[f(h(m)^c,v^d)]^{ab}$.

Once again, some of the secret parameters a, b, c and d could be made equal to 1.

Another aspect of the invention is directed to a medium storing a computer program for implementing the method according to the invention.

Likewise, an embodiment of the invention can advantageously be applied to protecting said medium against fraud, and more specifically to making transactions between an electronic chip and a banking application secure and to making the electronic chip of a SIM card of a mobile telephone secure. For a mobile telephone, said medium may be integrated into the mobile telephone.

The invention claimed is:

1. A method of securely delegating calculation by an entity participating in a mechanism involving the calculation by said entity of a value f(X,Y) of a bilinear function, wherein the method comprises the steps of:
   for said entity:
      choosing two secret parameters a and b;
      calculating the numbers $X^a$ and $Y^b$;
      supplying the two numbers $X^a$ and $Y^b$ to a computational server;
   for said computational server:
      calculating $f(X^a,Y^b)$;
      supplying the value of $f(X^a,Y^b)$ to said entity; and
   for said entity:
      extracting the $ab^{th}$ root of $f(X^a,Y^b)$.

2. A method of verification by an entity participating in a mechanism involving the verification by said entity that a value f(X,Y) of a bilinear function is equal to a given value u, wherein the method comprises the steps of:
   for said entity:
      choosing two secret parameters a and b;
      calculating the numbers $X^a$ and $Y^b$;
      supplying the two numbers $X^a$ and $Y^b$ to a computational server;
   for said computational server:
      calculating $f(X^a,Y^b)$;
      supplying the value of $f(X^a,Y^b)$ to said entity; and
   for said entity:
      comparing the value of $f(X^a,Y^b)^p$ to the number $u^q$, the numbers p and q satisfying the equation abp =q.

3. A method of verification by an entity participating in a mechanism involving the verification by said entity that two values f(X,Y) and f(Z,T) of a bilinear function are equal, wherein the method comprises the steps of:
   for said entity:
      choosing four secret parameters a, b, c and d;
      calculating the numbers $X^a$, $Y^b$, $Z^c$, and $T^d$;
      supplying the four numbers $X^a$, $Y^b$, $Z^c$, and $T^d$ to a computational server;
   for said computational server:
      calculating $f(X^a,Y^b)$ and $f(Z^c,T^d)$;
      supplying the values of $f(X^a,Y^b)$ and $f(Z^c,T^d)$ to said entity; and
   for said entity:
      comparing the values of $[f(X^a,Y^b)]^p$ and $[f(Z^c,T^d)]^q$, the numbers p and q satisfying the equation abp =cdq.

4. The method according to any one of claims 1 to 3, wherein at least one of the secret parameters is equal to 1.

5. A computational server, wherein the computational server is programmed for implementing the method according to any one of claims 1 to 3.

6. The method according to any one of claims 1 to 3, wherein the method is executed in an electronic system to protect against fraud.

7. The method according to claim 6, in which the electronic system is configured for making transactions between an electronic chip and a banking application secure.

8. The method according to claim 6, in which the electronic system is configured for to making the electronic chip of a mobile telephone SIM card secure.

9. An electronic chip, wherein the electronic chip is programmed for implementing, as said entity, the method according to any one of claims 1 to 3.

10. The electronic chip according to claim 9, wherein the electronic chip is integrated in a SIM card.

11. A non-transitory data storage medium comprising computer program instructions for execution by said entity of the steps of the method according to any one of claims 1 to 3.

12. A mobile telephone, wherein the mobile telephone comprises a data storage medium according to claim 11.

13. A non-transitory data storage medium comprising computer program instructions for execution by said computational server of the steps of the method according to any one of claims 1 to 3.

14. A computer program product stored on a non-transitory medium and comprising instructions such that, when said computer program commands a programmable data processing device, said instructions mean that said entity implements the method according to any one of claims 1 to 3.

15. A computer program product stored on a non-transitory medium and comprising instructions such that, when said computer program commands a programmable data processing device, said instructions mean that said computational server implements the method according to any one of claims 1 to 3.

* * * * *